(12) United States Patent
Blomquist

(10) Patent No.: US 6,410,682 B1
(45) Date of Patent: Jun. 25, 2002

(54) POLYMERIC AMINE FOR A GAS GENERATING MATERIAL

(75) Inventor: Harold R. Blomquist, Gilbert, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/753,442

(22) Filed: Jan. 3, 2001

(51) Int. Cl.[7] .................... C08G 67/02; C08G 73/00; C06B 47/08
(52) U.S. Cl. .................. 528/392; 528/229; 528/422; 528/423; 528/492; 525/539; 149/22; 149/36
(58) Field of Search ................ 528/492, 229, 528/423, 422, 392; 149/22, 36; 525/539

(56) References Cited

U.S. PATENT DOCUMENTS

| | | | |
|---|---|---|---|
| 3,979,374 A | 9/1976 | Kiovsky et al. | 526/12 |
| 4,013,596 A | 3/1977 | Einberg | 260/2 R |
| 4,358,327 A | 11/1982 | Reed, Jr. et al. | 149/19.4 |
| 5,472,535 A | 12/1995 | Mendenhall et al. | 149/36 |
| 5,552,257 A | 9/1996 | Stewart et al. | 430/201 |
| 5,741,998 A | 4/1998 | Hinshaw et al. | 149/19.6 |
| 5,952,438 A | 9/1999 | Kratz et al. | 525/471 |
| 5,952,459 A | 9/1999 | Broekhuis et al. | 528/423 |
| 6,117,255 A * | 9/2000 | Blomquist | 149/36 |
| 6,143,104 A * | 11/2000 | Blomquist | 149/61 |
| 6,225,419 B1 * | 5/2001 | Wong | 525/539 |
| 6,231,702 B1 * | 5/2001 | Blomquist | 149/36 |

OTHER PUBLICATIONS

Article "Reductive Amination of Ethylene/Carbon Monoxide Polyketones. A New Class of Polyamines", by D.D. Coffmann, H.H. Hoehn, & J.T. Maynard, pp. 6394–6399, 1954 The month in the date of publication is not available.

* cited by examiner

*Primary Examiner*—P. Hampton-Hightower
(74) *Attorney, Agent, or Firm*—Tarolli, Sundheim, Covell, Tummino & Szabo L.L.P.

(57) ABSTRACT

A gas generating material (16) comprises a polymeric amine. The polymeric amine has a polymer backbone that includes units of

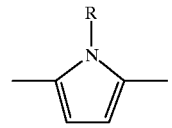

wherein R is a nitrogen containing organic radical of a nitrogen containing organic fuel that includes a primary amino group.

13 Claims, 1 Drawing Sheet

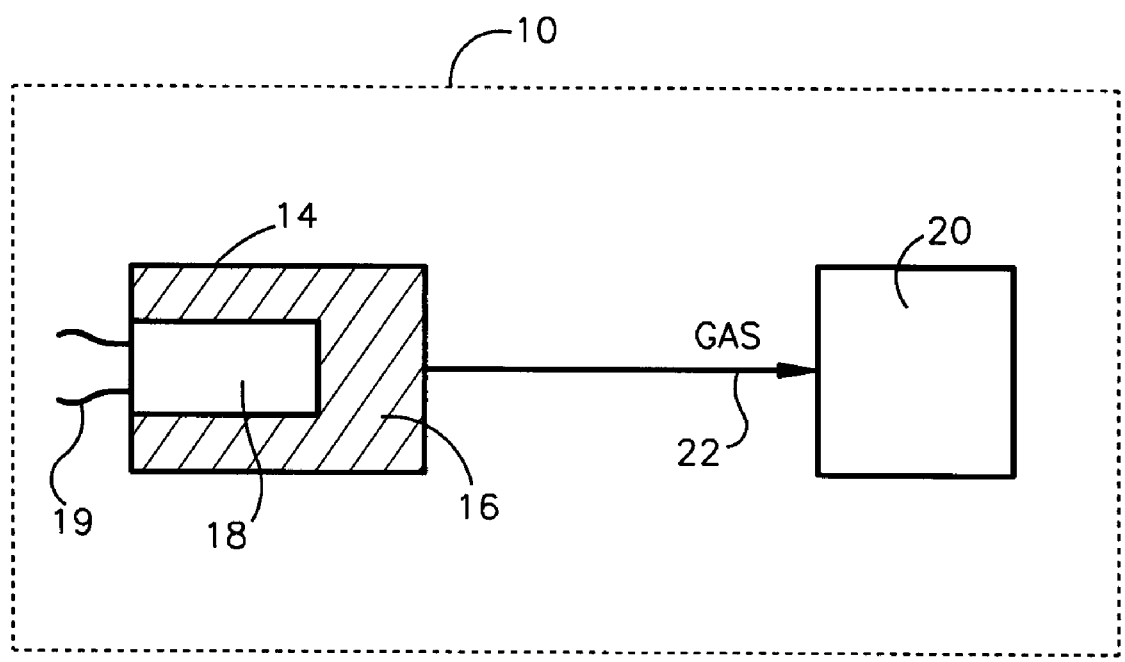
Figure

POLYMERIC AMINE FOR A GAS GENERATING MATERIAL

FIELD OF THE INVENTION

The present invention relates to a polymeric amine for a gas generating material. The gas generating material is particularly useful for inflating a vehicle occupant protection device.

BACKGROUND OF THE INVENTION

An inflatable vehicle occupant protection device, such as an air bag, is inflated by gas provided by an inflator. The inflator contains a gas generating material. The inflator further includes an igniter. The igniter is actuated to ignite the gas generating material when the vehicle experiences a collision for which inflation of the air bag is desired. As the gas generating material burns, it generates a volume of inflation gas. The inflation gas is directed into the air bag to inflate the air bag. When the air bag is inflated, it expands into the vehicle occupant compartment and helps to protect the vehicle occupant.

A typical gas generating material for use in an inflator for inflating a vehicle occupant protection device includes an oxidizer and a fuel bound into a solid mass by a binder. Fuels used in a gas generating material often have amino functional groups. Fuels with amino functional groups exhibit reduced chemical and physical stability when exposed to elevated temperatures, such as those encountered in a fire, or when exposed to temperature cycling.

SUMMARY OF THE INVENTION

The present invention is a gas generating material that comprises a polymeric amine. The polymeric amine has a polymer backbone that includes units of

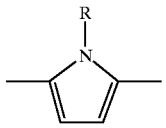

wherein R is a nitrogen containing organic radical of a nitrogen containing organic fuel that includes a primary amino group.

BRIEF DESCRIPTION OF THE DRAWING

Further features of the present invention will become apparent to those skilled in the art to which the present invention relates, from consideration of the following specification, with reference to the accompanying drawing which is a schematic illustration of an apparatus embodying the present invention.

DESCRIPTION OF PREFERRED EMBODIMENTS

Referring to the Figure, an apparatus 10 embodying the present invention comprises an inflator 14. The inflator 14 contains a generating material 16. The gas generating material 16 is ignited by an igniter 18 operatively associated with the gas generating material 16. Electric leads 19 convey electric current to the igniter 18 and are part of an electric circuit that includes a sensor (not shown). The sensor is responsive to vehicle deceleration above a predetermined threshold. The apparatus 10 also comprises a vehicle occupant protection device 20. A gas flow means 22 conveys gas, which is generated by combustion of the gas generating material 16, to the vehicle occupant protection device 20.

A preferred vehicle occupant protection device 20 is an air bag that is inflatable to help protect a vehicle occupant in the event of a collision. Other vehicle occupant protection devices that can be used in the present invention are inflatable seat belts, inflatable knee bolsters, inflatable air bags to operate knee bolsters, inflatable head liners, and inflatable side curtains.

In accordance with the present invention, the gas generating material 16 comprises a polymeric amine. The polymeric amine has a polymer backbone that includes a pyrrolediyl unit and an alkadiyl unit. The pyrrolediyl unit has the general formula:

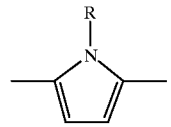

wherein R is a nitrogen containing organic radical of a nitrogen containing organic fuel that includes a primary amino group. A nitrogen containing organic fuel that includes a primary amino group has the general formula $R-NH_2$. In this formula, R is the nitrogen containing organic radical and $NH_2$ is the primary amino group. The nitrogen containing organic fuel of the present invention is a material capable of undergoing rapid and substantially complete oxidation upon combustion. The nitrogen containing organic fuel can be any nitrogen containing organic fuel commonly used as a fuel in a gas generating material as long as the nitrogen containing organic fuel includes a primary amino group. Examples of nitrogen containing organic fuels that include a primary amino group and that can be used in the present invention are energetic fuels such as aminotetrazoles, aminotriazoles, diaminofurazan, aminonitraminofurazan, nitroguanidine, guanidine nitrate, hydrazine, salts of hydrazine, triaminoguanidine nitrate, amino-nitro-furazan, amino-azido-furazan, urea, salts of urea, and mixtures thereof. More preferred nitrogen containing organic fuels that include an amino group are heterocycle compounds, such as aminotetrazoles, aminotriazoles, and mixtures thereof.

The alkadiyl unit of the polymeric amine has the general formula:

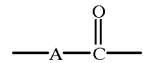

wherein A is a substituted alkadiyl or an unsubstituted alkadiyl. The alkadiyl may include from 2 to about 10,000 carbon atoms in the backbone of the alkadiyl. Preferably, the alkadiyl includes an amount of carbon atoms effective to form an alkadiyl unit that has an oxygen balance greater than −90 molar percent. By oxygen balance, it is meant the oxygen content of the alkadiyl unit relative to the total amount of oxygen required for, upon combustion, oxidation of all the carbon and hydrogen atoms in the alkadiyl unit to carbon dioxide and water. An alkadiyl unit that has a negative oxygen balance requires additional oxygen during combustion to oxidize the carbon and hydrogen atoms in the alkadiyl unit to carbon dioxide and water. More preferably, the alkadiyl is a 1,3-alkadiyl or a 1,2-alkadiyl.

The polymeric amine backbone has a plurality of pyrrolediyl units and a plurality of alkadiyl-units. The pyrrolediyl units and the alkadiyl units can be distributed in the polymer backbone of the polymeric amine in a random or alternating manner. Preferably, the pyrrolediyl units and alkadiyl units are distributed randomly. The ratio of pyrrolediyl units to alkadiyl units in the polymer backbone of the polymeric amine can vary from about 1:100 to about 100:1. As the percentage of pyrrolediyl units in polymer backbone of the polymeric amine increases, the crystallinity of the polymeric amine decreases. The polymeric amine is amorphous when the ratio of pyrrolediyl units to alkadiyl units is greater than 1:6.

The polymeric amine of the present invention is prepared by reacting a copolymer of an olefin and carbon monoxide with the nitrogen containing organic fuel. The copolymer that is used in the preparation of the polymeric amine can be a perfectly alternating copolymer (i.e., molar ratio of olefin to carbon monoxide is 1:1 with a 1,2-addition olefin), a semi-perfectly alternating copolymer (i.e., molar ratio of olefin to carbon monoxide is 1:1, but with some olefin addition other than 1,2), or a random copolymer. If the copolymer is a random copolymer, the copolymer must contain a 1,4-dicarbonyl unit (i.e., a gamma diketone unit) across the polymer backbone of the copolymer in order to ensure reaction of the copolymer with the nitrogen containing organic fuel. Preferably, the copolymer is a perfectly alternating copolymer or a semi-perfectly alternating copolymer.

The copolymer of an olefin and carbon monoxide is prepared by reacting an olefin with carbon monoxide in the presence of a catalyst system. Catalyst systems for preparing copolymers of olefins and carbon monoxide are well known in the art. Preferred catalyst systems include a complex tetracyanonickelate catalyst system and a palladium catalyst system. A preferred olefin used in preparing the copolymer is ethylene. Ethylene when reacted with carbon monoxide in the presence of the catalyst system forms a copolymer with the following general formula:

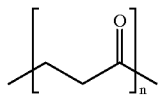

Examples of other olefins that can be use in preparing the copolymer include propylene, styrene, vinyl acetate, and ethyl acrylate.

The copolymer used in preparing the polymeric amine has an average molecular weight in the range of about 200 to about 500,000 Daltons. Preferably, the copolymer has an average molecular weight in the range of about 1,000 to about 5,000 Daltons and, more preferably, an average molecular weight in the range of about 2,000 to 3,500 Daltons.

The copolymer is mixed with the nitrogen containing organic fuel to form a reaction mixture. Optionally, a catalyst and a solvent can be mixed with the copolymer and the nitrogen containing organic fuel to facilitate the formation of the polymeric amine. Examples of catalysts, which can be used, are strong acids such as trifluoroacetic acid and p-toluenesulfonic acid. A preferred catalyst is trifluoroacetic acid. The amount of catalyst employed varies from about 0.1% to about 2.0% by weight, based on the combined weight of the copolymer and the nitrogen containing organic fuel. A preferred catalyst concentration is between about 0.3% and about 1.0% by weight, based on the combined weight of the copolymer and the nitrogen containing organic fuel. Examples of solvents that can be used in the present invention are m-cresol, toluene, and hexafluoroisopropanol. The amount of solvent employed is not critical. Preferred amounts vary from 99% by weight to about 80% by weight, based on the combined weight of the resulting solution.

A compound such as magnesium sulfate can also be mixed with the nitrogen containing organic fuel and copolymer to absorb water generated in the reaction of the copolymer, thereby improving the reaction equilibrium. The amount of absorbent, when added, varies from about 1% by weight to about 5% by weight, based on the combined weight of the copolymer and the primary amine organic fuel.

The reaction mixture is heated to a temperature of about 40° C. to about 100° C. Preferably the reaction mixture is heated to a temperature of about 70° C. to about 80° C. The pressure of the reaction mixture may be maintained at atmospheric pressure, sub-atmospheric pressure, or super-atmospheric pressure.

Upon heating, the copolymer readily reacts with the nitrogen containing organic fuel in a condensation type reaction to form the polymeric amine. A reaction scheme of this condensation type reaction is illustrated as follows:

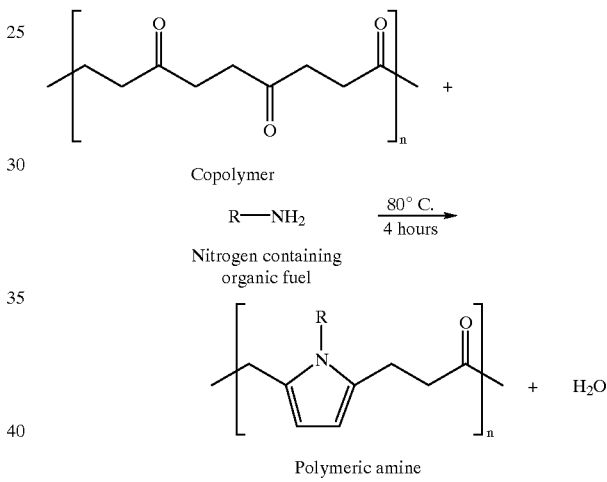

The polymeric amine so formed is used as a fuel in a gas generating material. The polymeric amine of the present invention has the advantage that it does not chemically and physically decompose when exposed to elevated temperatures, such as those encountered in a fire, or when exposed to temperature cycling (e.g., temperatures from about −40° C. to about 110° C.) to which an inflator may be subjected. The polymeric amine can also used as an energetic binder to bind other components of the gas generating material into a solid mass. When used as an energetic binder in the gas generating material, the polymeric amine is preferably mixed with a processing aid, such as a plasticizer and solvent, to improve the extrudability and solubility of the polymeric amine.

The weight percent of the polymeric amine in the gas generating material is that weight percent sufficient to achieve sustained combustion of the gas generating material. A preferred weight percent is about 5% to about 85% based on the weight percent of the gas generating material.

The gas generating material also includes an oxidizer in addition to the polymeric amine. The oxidizer in the gas generating material can be any oxidizer commonly used in a gas generating material, such as inorganic salt oxidizers. Examples of an inorganic salt oxidizer that can be used in the gas generating material of the present invention are alkali metal nitrates such as sodium nitrate and potassium nitrate, alkaline earth metal nitrates such as strontium nitrate and barium nitrate, alkali metal perchlorates such as sodium perchlorate, potassium perchlorate, and lithium perchlorate, alkaline earth metal perchlorates, alkali metal chlorates such as potassium chlorate, alkaline earth metal chlorates, ammonium perchlorate, ammonium nitrate, or a mixture thereof.

A preferred oxidizer is ammonium nitrate. Ammonium nitrate is preferred because it produces, upon combustion, a gas product essentially free of smoke and toxic gases.

When ammonium nitrate is used as the oxidizer, the ammonium nitrate is preferably phase stabilized. The phase stabilization of ammonium nitrate is well known. In one method, the ammonium nitrate is doped with a metal cation in an amount that is effective to minimize the volumetric and structural changes associated with phase transitions to pure ammonium nitrate. A preferred phase stabilizer is potassium nitrate. Other useful phase stabilizers include potassium salts such as potassium dichromate, potassium oxalate, and mixtures of potassium dichromate and potassium oxalate. Ammonium nitrate can also be stabilized by doping with copper and zinc ions. Other compounds and methods that are effective to phase stabilize ammonium nitrate are well known and suitable in the present invention.

Ammonium perchlorate, although a good oxidizer, is preferably combined with a non-halogen alkali metal or alkaline earth metal salt. Preferred mixtures of ammonium perchlorate and a non-halogen alkali metal or an alkaline earth metal salt are ammonium perchlorate and sodium nitrate, ammonium perchlorate and potassium nitrate, and ammonium perchlorate and lithium carbonate. Ammonium perchlorate produces, upon combustion, hydrogen chloride. Non-halogen alkali metal or alkaline earth metal salts react with hydrogen chloride produced upon combustion to form an alkali metal chloride or an alkaline earth metal chloride. Preferably, the non-halogen alkali metal or alkaline earth metal salt is present in an amount sufficient to produce a combustion product that is substantially free (i.e., less than 2% by weight of the combustion product) of hydrogen chloride.

Preferably, the oxidizer is ground into two fractions, one being a coarse fraction, for instance, having an average particle size of about 100 to about 600 microns, and the other being a fine fraction, for instance, having an average particle size of about 10 to about 60 micron. The amount of the course fraction in the gas generating material is preferably in the range of about 50% to about 75% by weight, based on the weight of the oxidizer. The amount of the fine fraction in the gas generating material is preferably about 25% to about 50% by weight, based on the weight of the oxidizer.

The amount of oxidizer in the gas generating material is that amount necessary to achieve sustained combustion of the gas generating material. The amount of oxidizer necessary to achieve sustained combustion of the gas generating material is from about 95% to about 15% by weight of the gas generating material. A preferred amount of oxidizer is that amount necessary to oxygen balance the gas generating material and produce, on combustion with the polymeric amine, a combustion product that is substantially free of carbon monoxide. By substantially free of carbon monoxide, it is meant that the volume of carbon monoxide is less than about 4% by volume of gas produced upon combustion.

The gas generating material in the present invention can comprise other ingredients in addition to the polymeric amine and the oxidizer. For instance, the gas generating material can comprise a supplemental fuel. Preferred supplemental fuels are organic nitrates or nitro-organics such as nitroguanidine (NQ), guanidine nitrate (GN), triaminoguanidine nitrate (TAGN), tetramethyl ammonium nitrate, cyclotrimethylenetrinitramine (RDX), cyclotetramethylenetetranitramine (HMX), and nitrocellulose, azoles including triazoles and tetrazoles such as 5-aminotetrazole (5-AT) and 3-nitro-1,2,4-triazole-5-one (NTO), oxamide, and urea and urea salts. The amount of supplemental fuel can be in the range of 0 to about 50% by weight based on the weight of the gas generating material.

The gas generating material can also include a binder. Preferably, the binder is non-energetic. Suitable binders for gas generating materials are well known in the art. Preferred binders include cellulose acetate butyrate, polycarbonate, polyurethanes, polyesters, polyethers, polysuccinates, thermoplastic rubbers, polybutadienes, polystyrene, and mixtures thereof. A preferred binder is KRATON (trademark), a polyethylene/butylene-polystyrene block copolymer manufactured by Kraton Inc. A preferred amount of binder is from about 0 to about 10% by weight of the gas generating material. More preferably, the amount of binder is from about 2.5% to about 5% by weight of the gas generating material.

The gas generating material may also include 0 to about 10% by weight of other ingredients commonly added to a gas generating material for actuating a vehicle occupant protection apparatus, such as processing aids, coolants, burn rate modifiers, and ignition aids.

Preferably, the components of the gas generating material 16 are present in a weight ratio adjusted to produce, upon combustion, a gas product that is essentially free of carbon monoxide.

The gas generating material is prepared by adding to a conventional mixer the polymeric amine and a solvent. The solvent is any solvent that readily dissolves the polymeric amine. Preferred solvents are non-aqueous polar solvents such as toluene and methylene chloride.

The polymeric amine and the solvent are mixed until a viscous, yet fluid solution is formed. The solution of polymeric amine is poured into an extruder, such as a heat jacketed twin screw extruder. The inorganic salt oxidizer and other ingredients, such as supplemental fuel, burn rate modifier, plasticizer and coolant, if utilized, are added to and mixed with the polymeric amine solution. Alternatively, the inorganic salt oxidizer and other ingredients, such as supplemental fuel, burn rate modifier, plasticizer and coolant, if utilized, can be mixed with the solution of polymeric amine prior to placing the solution of polymeric amine in the extruder. The inorganic salt oxidizer forms a viscous slurry, having a dough like consistency, with the solution of polymeric amine.

The viscous slurry is advanced from the extruder, through a shaping device or die with a predetermined diameter, and cut to desired length. The gas generating material so formed may be in the shape of a single grain or a plurality of grains. The gas generating material shaped into a plurality of grains has a configuration similar to that of an aspirin tablet. Preferably, the gas generating material contains surface area increasing features, such as perforations or slots. Perforations or slots enhance burning of the gas generating material and mass flow of the combustion product away from the grains during combustion of the grains.

The solvent is evaporated from the gas generating material by heating the gas generating material at an elevated temperature (i.e., about 50° C. to about 60° C.). The gas generating material is generally a resilient solid, like a hard rubber, capable of withstanding shock without permanent deformation at 85° C. and without being brittle at −40° C.

From the above description of the invention, those skilled in the art will perceive improvements, changes and modifications. Such improvements, changes and modifications within the skill of the art are intended to be covered by the appended claims.

Having described the invention the following is claimed:

1. A gas generating material comprising a polymeric amine, said polymeric amine having a polymer backbone that includes units of

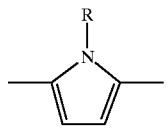

wherein R is a nitrogen containing organic radical of a nitrogen containing organic fuel that includes a primary amino group.

2. The gas generating material of claim 1 wherein the nitrogen containing organic fuel is selected from the group consisting of aminotetrazoles, aminotriazoles, diaminofurazan, amino-nitraminofurazan, nitroguanidine, guanidine nitrate, hydrazine, salts of hydrazine, triaminoguanidine nitrate, amino-nitro-furazan, amino-azido-furazan, urea, salts of urea, and mixtures thereof.

3. The gas generating material of claim 1 wherein the nitrogen containing organic fuel is selected from the group consisting of aminotetrazoles, aminotriazoles, and mixtures thereof.

4. The gas generating material of claim 1 wherein the polymer backbone further includes units of

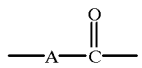

wherein A is a substituted alkadiyl or an unsubstituted alkadiyl.

5. The gas generating material of claim 4 wherein A comprises a 1,3 alkadiyl or a 1,2 alkadiyl.

6. The gas generating material of claim 1 wherein the polymeric amine comprises about 5% to about 85% by weight of the gas generating material.

7. The gas generating material of claim 1 further comprising an oxidizer.

8. The gas generating material of claim 7 wherein the oxidizer is an inorganic salt oxidizer selected from the group consisting of alkali metal nitrates, alkaline earth metal nitrates, alkali metal perchlorates, alkaline earth metal perchlorates, alkali metal chlorates, alkaline earth metal chlorates, ammonium perchlorate, ammonium nitrate, and mixtures thereof.

9. The gas generating material of claim 7 wherein the oxidizer comprises about 15% to about 95% by weight of the gas generating material.

10. A polymeric amine for use in a gas generating material having a polymeric backbone that includes units

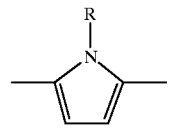

wherein R is a nitrogen containing organic radical of a nitrogen containing organic fuel selected from the group consisting of aminotetrazoles, aminotriazoles, diaminofurazan, amino-nitraminofurazan, nitroguanidine, guanidine nitrate, hydrazine, salts of hydrazine, triaminoguanidine nitrate, amino-nitro-furazan, amino- azido-furazan, urea, salts of urea, and mixtures thereof.

11. The polymeric amine of claim 10 wherein the nitrogen containing organic fuel is selected from the group consisting of aminotetrazoles, aminotriazoles, and mixtures thereof.

12. The polymeric amine of claim 10 wherein the polymer backbone further includes units of

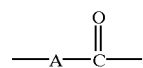

wherein A is a substituted alkadiyl or an unsubstituted alkadiyl.

13. The polymeric amine of claim 12 wherein A comprises a 1,3 alkadiyl or a 1,2 alkadiyl.

* * * * *